(12) United States Patent
Chien et al.

(10) Patent No.: US 10,033,467 B2
(45) Date of Patent: Jul. 24, 2018

(54) METHOD AND APPARATUS FOR GENERATION OF COHERENT AND FREQUENCY-LOCK OPTICAL SUBCARRIERS

(75) Inventors: Hung-Chang Chien, Rockaway, NJ (US); Jianjun Yu, Basking Ridge, NJ (US)

(73) Assignees: ZTE CORPORATION (CHINA), Shenzhen (CN); ZTB (USA) Inc., Richardson, TX (US)

( * ) Notice: Subject to any disclaimer, the term of this patent is extended or adjusted under 35 U.S.C. 154(b) by 543 days.

(21) Appl. No.: 14/113,012

(22) PCT Filed: Apr. 25, 2012

(86) PCT No.: PCT/US2012/034863
§ 371 (c)(1),
(2), (4) Date: Dec. 30, 2013

(87) PCT Pub. No.: WO2012/148945
PCT Pub. Date: Nov. 1, 2012

(65) Prior Publication Data
US 2014/0105615 A1    Apr. 17, 2014

Related U.S. Application Data

(60) Provisional application No. 61/479,129, filed on Apr. 26, 2011.

(51) Int. Cl.
*H04B 10/04* (2006.01)
*H04B 10/548* (2013.01)

(52) U.S. Cl.
CPC .................. *H04B 10/548* (2013.01)

(58) Field of Classification Search
CPC ............... H04B 10/548; H04B 10/505; H04B 10/2575; H04B 10/5051; H04B 10/50572;
(Continued)

(56) References Cited

U.S. PATENT DOCUMENTS 5,566,381 A * 10/1996 Korotky ............ H04B 10/2537
398/147
6,535,315 B1   3/2003 Way et al.
(Continued)

FOREIGN PATENT DOCUMENTS

FR    WO 2010034753 A1 *  4/2010 ......... H04B 10/2537
WO    WO-2010034753 A1    4/2010

OTHER PUBLICATIONS

Jianjun et al. (400Gb/s (4 x 100Gb/s) orthogonal PDM-RZ-QPSK Dwdm signal transmission over 1040km SMF-28. Jianjun Yu, Xiang Zhou, Ming-Fang Huang, Dayou Qian, Philip N. Ji, Ting Wang, and Peter Magill; Published Sep. 22, 2009).*
(Continued)

*Primary Examiner* — Hibret Woldekidan
(74) *Attorney, Agent, or Firm* — Drinker Biddle & Reath LLP

(57) ABSTRACT

A method and apparatus for generating sub-carriers is disclosed. Coherent optical sub-carriers with sub-carrier spacing are generated for carrying an orthogonal frequency division multiplexed (OFDM) signal. Multiple peaks are generated by cascading multiple phase modulators driven by different radio frequency sources.

24 Claims, 5 Drawing Sheets

A multi-subcarrier generation system

(58) Field of Classification Search
CPC .............. H04B 10/50577; H04B 10/50; H04B 10/5561; H04B 10/5165; H04J 14/0298; H04L 27/2627
USPC .......................................... 398/188, 183, 182
See application file for complete search history.

(56) References Cited

U.S. PATENT DOCUMENTS

| | | | | |
|---|---|---|---|---|
| 6,616,353 | B1* | 9/2003 | Helkey | G02F 1/225 356/450 |
| 7,761,012 | B2* | 7/2010 | Yu | H04B 10/2575 398/182 |
| 7,853,153 | B2* | 12/2010 | Kawanishi | G02F 1/2255 359/278 |
| 8,582,983 | B2* | 11/2013 | Yu | H04B 10/506 398/115 |
| 8,724,204 | B2* | 5/2014 | Qiu | G02F 1/3536 359/238 |
| 8,781,325 | B2* | 7/2014 | Yu | H04B 10/5051 398/182 |
| 9,209,927 | B2* | 12/2015 | Yu | H04J 14/0298 |
| 2002/0015212 | A1* | 2/2002 | Fujiwara | G02F 1/0121 359/238 |
| 2003/0142384 | A1* | 7/2003 | Kurebayashi | H04B 10/505 359/237 |
| 2007/0140704 | A1 | 6/2007 | Mauro et al. | |
| 2007/0292143 | A1* | 12/2007 | Yu | H04B 10/25754 398/188 |
| 2011/0081151 | A1* | 4/2011 | Yu | H04B 10/532 398/79 |
| 2011/0164658 | A1* | 7/2011 | Penninckx | H04B 10/2537 375/130 |
| 2012/0219296 | A1* | 8/2012 | Yu | H04B 10/5051 398/79 |
| 2013/0050795 | A1* | 2/2013 | Qiu | G02F 1/3536 359/238 |

OTHER PUBLICATIONS

International Search Report for PCT/US2012/034863 mailed Oct. 30, 2012.
Written Opinion for the International Search Authority for PCT/US2012/034863 mailed Oct. 30, 2012.

* cited by examiner

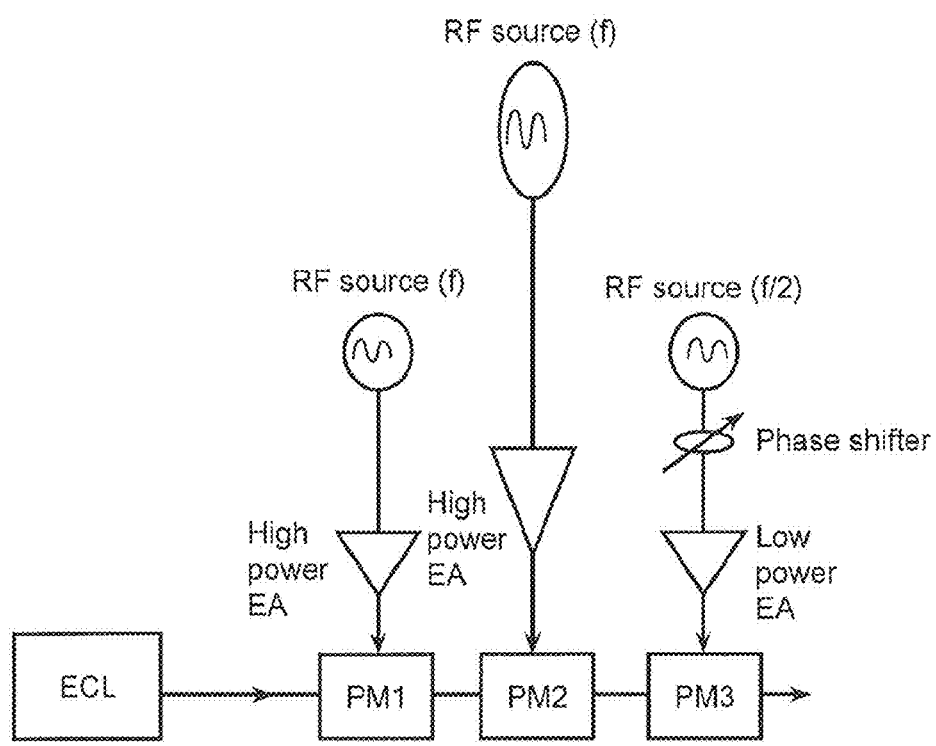
Fig. 1. A multi-subcarrier generation system

Fig. 2. Optical spectrum (a) after PM1; (b) after PM2; and (c) after OC2.

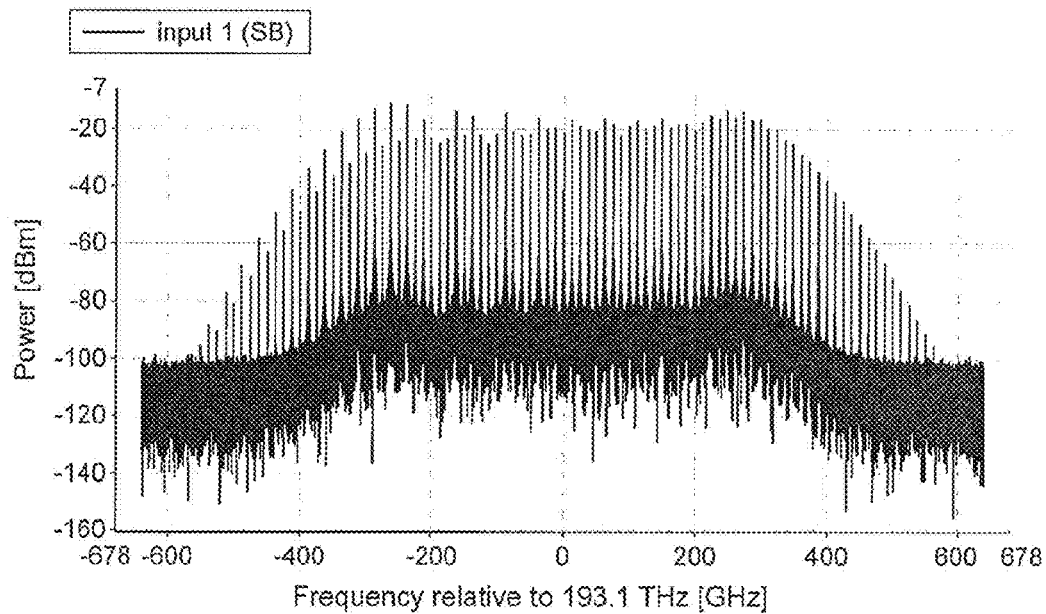

Fig. 3(c)

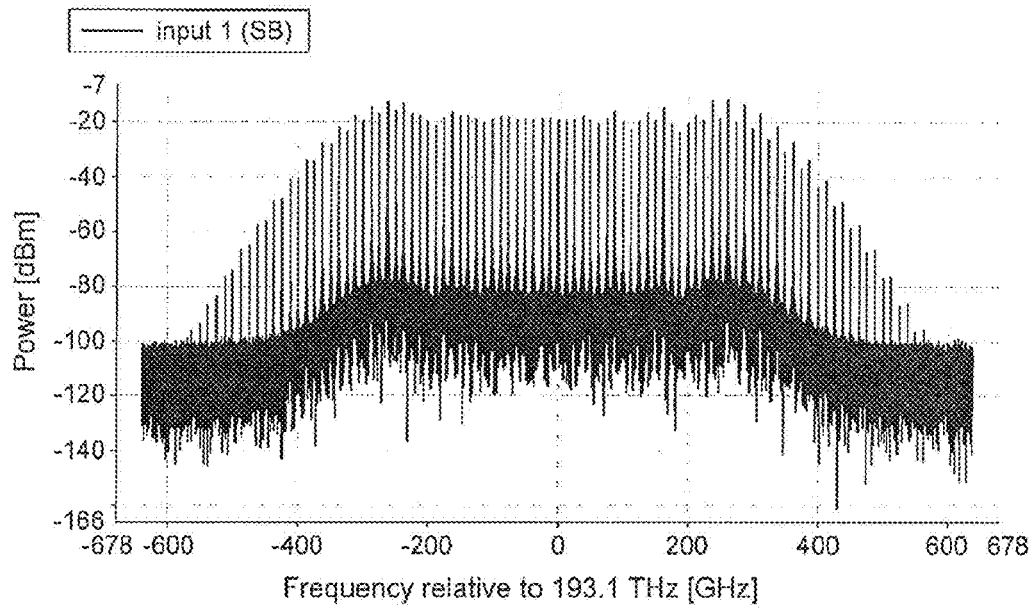

Fig. 3(d)

Fig. 3. Optical spectrum (a) after one phase modulator driven by 25GHz; (b) after cascaded phase modulators driven by 25 and 12.5GHz individually with synchronized clock (0 degree shift); (c) after cascaded phase modulators driven by 25 and 12.5GHz individually with non-synchronized clock (25 degree shift); and (d) after cascaded phase modulators driven by 25 and 12.5GHz individually with non-synchronized clock (50 degree shift).

METHOD AND APPARATUS FOR GENERATION OF COHERENT AND FREQUENCY-LOCK OPTICAL SUBCARRIERS

FIELD OF THE INVENTION

The field of the present invention generally pertains to optical communication architecture, and particularly to optical methods and systems for generating subcarriers.

BACKGROUND

In order to meet the bandwidth increase of optical networks of the future, a rate higher than 100 Gb/s per channel is required. As such, transmission rates of 1 Tb/s and beyond are becoming hot research topics, as described in Y. Ma, Q. Yang, Y. Tang, S. Chen and W. Shieh, "1-Tb/s per channel coherent optical OFDM transmission with subwavelength bandwidth access", in Proc. OFC, paper PDPC1 (2009); A. Sano, E. Yamada, H. Masuda, E. Yamazaki, T. Kobayashi, and E. Yoshida, "No-Guard-Interval Coherent Optical OFDM for 100-Gb/s Long-Haul WDM Transmission", J. Lightw. Technol., vol. 27, no. 16, pp. 3705-3713, 2009; R. Dischler, and F. Buchali, "Transmission of 1.2 Tb/s continuous waveband PDM-OFDM-FDM signal with spectral efficiency of 3.3 bit/S/Hz over 400 km of SSMF", in Proc. OFC, paper PDPC2 (2009); S. Chandrasekhar et al., "Transmission of a 1.2-Tb/s 24-Carrier no-guard-interval coherent OFDM superchannel over 7200-km of ultra-large-area fiber", in Proc. ECOC, paper PD 2.6 (2009); J. Yu, X. Zhou, M.-F. Huang, D. Qian, P. N. Ji, T. Wang, and P. Magill, "400 Gb/s (4×100 Gb/s) orthogonal PDM-RZ-QPSK DWDM Signal Transmission over 1040 km SMF-28", Optics Express, 17, 17928-17933 (2009); D. Hillerkuss et al., "Single source optical OFDM transmitter and Optical FFT receiver demonstrated at line rates of 5.4 and 10.8 Tbit/s", OFC 2010: PDPC1; and J. Yu, "1.2 Tbit/s orthogonal PDM-RZ-QPSK DWDM signal transmission over 1040 km SMF-28", Electron. Lett., Vol. 46, No. 11, 2010: 775-777.

Currently, the highest bit rate per channel for optical signal generation is 5.4 Tb/s OFDM polarization multiplexed quadrature phase shift key (PM-QPSK) and 10.8 Tb/s OFDM polarization multiplexed quadrature amplitude modulation with 16 symbol constellation (PM-16QAM) by the comb generation or supercontinuum technique described in D. Hillerkuss et al., "Single source optical OFDM transmitter and Optical FFT receiver demonstrated at line rates of 5.4 and 10.8 Tbit/s", in Proc. OFC 2010, PDPC1 (2010). However, due to the limited optical signal-to-noise ratio (OSNR) of the OFDM optical signal generation by the supercontinuum technique, transmission distance is quite limited.

Use of a cascaded phase modulator and intensity modulator can generate multi-optical subcarriers as described in J. Yu, X. Zhou, M.-F. Huang, D. Qian, P. N. Ji, T. Wang, and P. Magill, "400 Gb/s (4×100 Gb/s) orthogonal PDM-RZ-QPSK DWDM Signal Transmission over 1040 km SMF-28", Opt Express., 17, 17928-17933 (2009); J. Yu, "1.2 Tbit/s orthogonal PDM-RZ-QPSK DWDM signal transmission over 1040 km SMF-28", Electron. Lett, 46, 775-777 (2010); T. Healy et al., "Multi-wavelength source using low drive-voltage amplitude modulators for optical communications," Opt. Express, 15, 2981-2986 (2007); T. Yamamoto, et al., "Multicarrier light source with flattened spectrum using phase modulators and dispersion medium", J. of Lightwave. Technol., Vol. 27, No. 19, 2009: 4297-4305; and T. Yamamoto, et al., "multicarrier light source with flattened spectrum using phase modulators and dispersion medium", J. of Lightwave. Technol., Vol. 27, No. 19, 2009: 4297-4305.

Recently, by using this technique, generation of a 400-Gb/s optical signal has been demonstrated, as described in J. Yu, X. Zhou, M.-F. Huang, D. Qian, P. N. Ji, T. Wang, and P. Magill, "400 Gb/s (4×100 Gb/s) orthogonal PDM-RZ-QPSK DWDM Signal Transmission over 1040 km SMF-28", Opt Express., 17, 17928-17933 (2009), and generation of a 1.2 Tb/s optical signal is described in J. Yu, "1.2 Tbit/s orthogonal PDM-RZ-QPSK DWDM signal transmission over 1040 km SMF-28", Electron. Lett, 46, 775-777 (2010).

Due to the limited amplitude of the radio frequency (RF) signals on the phase modulator, only 12 subcarriers (with 25 GHz spacing) are generated, covering an approximate 300 GHz bandwidth with flat spectrum amplitude, as described in J. Yu, "1.2 Tbit/s orthogonal PDM-RZ-QPSK DWDM signal transmission over 1040 km SMF-28", Electron. Lett, 46, 775-777 (2010). In order to increase the bit rate for the single channel OFDM signals, more subcarriers need to be generated.

A scheme for generating subcarriers using a re-circulating frequency shifter (RFS) has been used to generate 112 subcarriers (or peaks) based upon the frequency shifting a cascade of two phase modulators. However, because the tone-to-noise ratio of the multiple subcarriers generated by RFS is only approximately 20 to 25 dB, it is not enough for high-speed signal transmission over long distance.

A cascade of phase and intensity modulators used to generate multiple subcarriers can achieve a high tone-to-noise ratio with flat amplitude because the subcarriers generated can be used for long distance transmission. However, in order to get flat amplitude, there is a large loss in the intensity modulator (usually over 10 dB loss is needed).

SUMMARY OF THE INVENTION

The present invention is directed toward a method and system to generate flat amplitude with small insertion loss by cascading at least two phase modulators driven by different radio frequency sources.

In these methods and systems, a lightwave is modulated by a phase modulator, having a half-wave voltage, that is driven by a first fixed frequency radio frequency clock signal with an amplitude that is at least a few times greater than the half-wave voltage. The lightwave is then modulated by a cascaded phase modulator driven by another fixed radio frequency clock signal with an amplitude that is also at least a few times greater than the half-wave voltage. The first fixed frequency may be equal to, and driven synchronously with, the second fixed frequency.

In another aspect of the present invention, these methods and systems include modulating the lightwave by a cascaded third phase modulator driven by a third fixed radio frequency signal that is equal to twice the first or second fixed frequency signals. The third cascaded phase modulator need not be driven synchronously with the other phase modulators. Moreover, the order of the cascaded modulators is not strictly mandated.

Additional aspects and advantages of the improvements will appear from the drawings and the description of the preferred embodiment.

BRIEF DESCRIPTION OF THE DRAWINGS

Embodiments of the present invention are illustrated by way of the accompanying drawings, in which:

FIG. 1 is a multi-subcarrier generation system.

DETAILED DESCRIPTION OF THE PREFERRED EMBODIMENT

The principle of multiple subcarrier generation by cascading phase modulators driven by different radio frequency (RF) sources is shown in FIG. 1. ECL is an external cavity laser, PM1 Is a first phase modulator, and EA is an electrical amplifier.

In contrast to previous schemes as described in Y. Ma, Q. Yang, Y. Tang, S. Chen and W. Shieh, "1-Tb/s per channel coherent optical OFDM transmission with subwavelength bandwidth access", in Proc. OFC, paper PDPC1 (2009); J. Yu, X. Zhou, M.-F. Huang, D. Qian, P. N. Ji, T. Wang, and P. Magill, "400 Gb/s (4×1000 b/s) orthogonal PDM-RZ-QPSK DWDM Signal Transmission over 1040 km SMF-28", Optics Express, 17, 17928-17933 (2009); and J. Yu, "1.2 Tbit/s orthogonal PDM-RZ-QPSK DWDM signal transmission over 1040 km SMF-28", Electron. Lett., Vol. 46, No. 11, 2010: 775-777, two cascaded phase modulators are employed. The continuous wave (CW) lightwave generated from one narrow linewidth laser is modulated by the two cascaded phase modulators that are driven by different RF clock signals. The phase modulators are driven by a RF clock signal with a fixed frequency of f. The amplitude of the RF signal after a high power booster electrical amplifier is a few times the half-wave voltage of the first phase modulator (PM1), in order to generate multiple subcarriers with high tone-to-noise ratio.

Figure 2A:
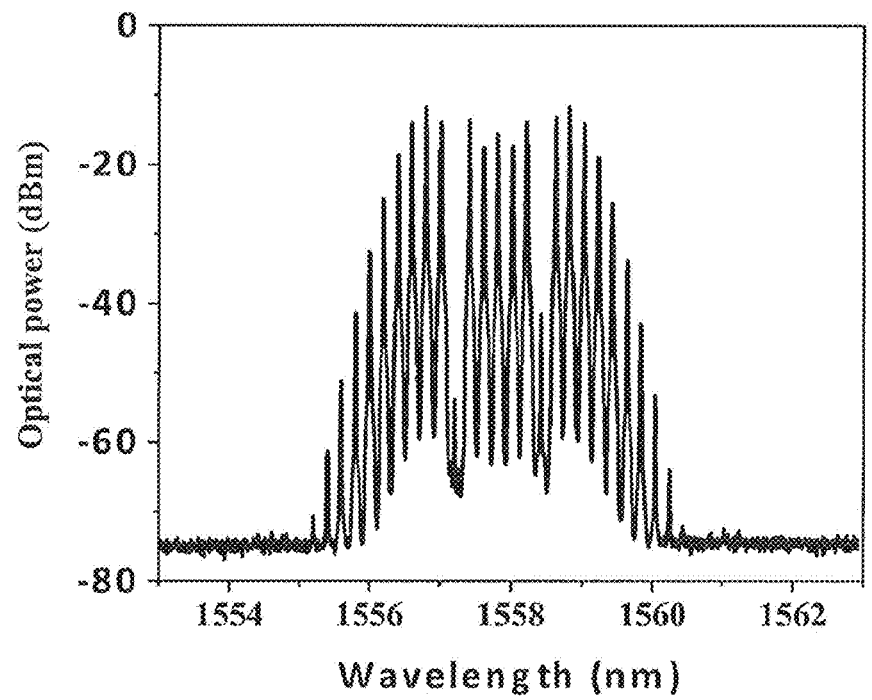
FIG. 2 illustrates the optical spectrum (with 0.02 nm resolution) of a lightwave after (a) phase modulator 1; (b) phase modulator 2; and (c) optical coupler 2.

FIG. 2(a) shows the optical spectrum after PM1. In FIG. 2(a), the RF clock frequency is 25 GHz, the RF peak-to-peak voltage after the booster electrical amplifier is 17 V, and the half-wave voltage of the phase modulator is 4 V. In order to generate more subcarriers, more phase modulators driven by frequency of f can be cascaded. In FIG. 1, a second phase modulator (PM2) is cascaded.

Figure 2B:
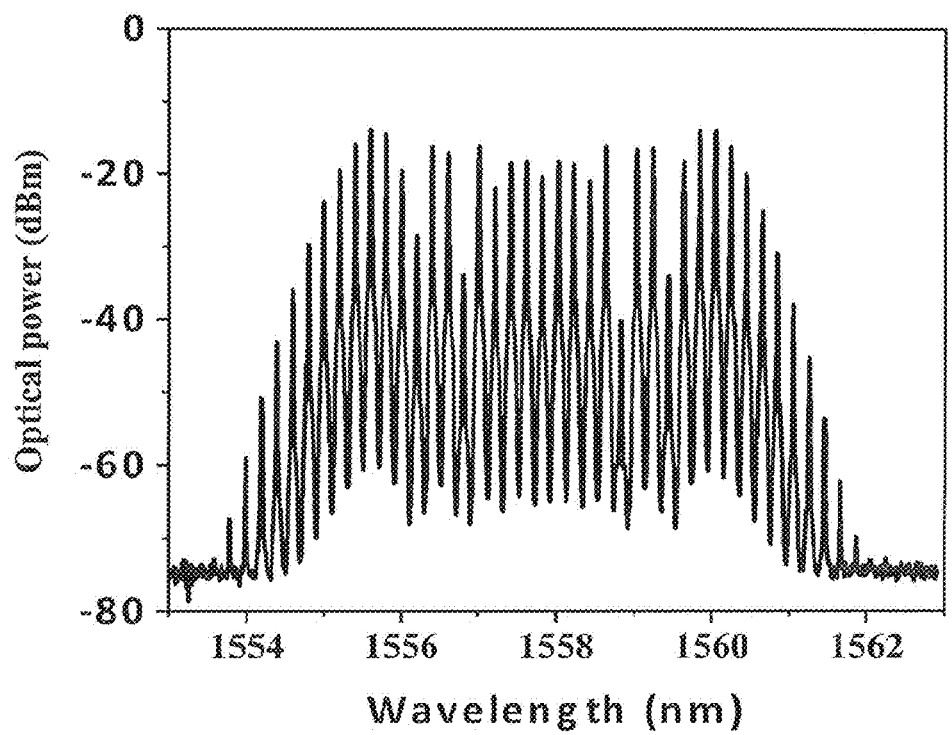

FIG. 2(b) shows the optical spectrum after PM2. The RF clock frequency is also 25 GHz, the RF peak-to-peak voltage after the booster electrical amplifier is 17 V, and the half-wave voltage of the phase modulator is 4 V. In order to obtain flat amplitude subcarriers, a third phase modulator (PM3) is cascaded. This phase modulator is driven by a low-level RF signal with fixed frequency of 2f. For example, the RF signal to drive the third phase modulator may be identical to the half-wave voltage of the phase modulator. PM1, PM2, and PM3 can be placed in any order within the cascade.

Figure 2C:
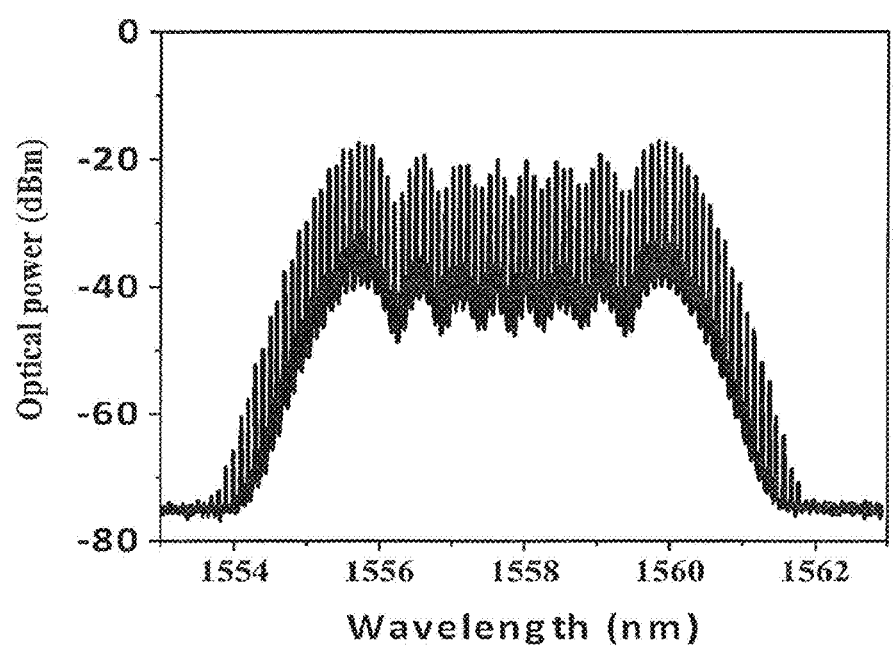

The optical spectrum after PM3 is shown in FIG. 2(c). The phase relationship of the electrical signals on PM1, PM2, and PM3 may be adjusted to affect the overall flatness subcarriers. PM1 and PM2 are preferably synchronized driven, while PM3 need not be fully synchronized driven.

Figure 3A:
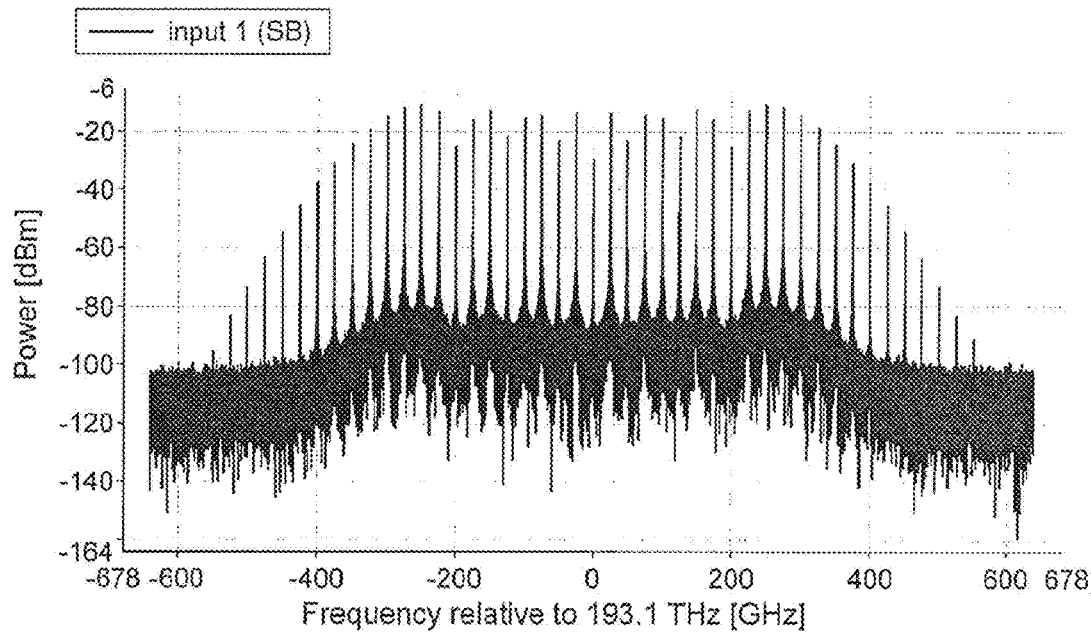
FIG. 3 illustrates the optical spectrum (a) after one phase modulator driven by a 25 GHz signal; (b) after cascaded phase modulators driven by 25 and 12.5 GHz individually with a synchronized clock (0 degree shift); (c) after cascaded phase modulators driven by 25 and 12.5 GHz individually with a non-synchronized clock (25 degree shift); and (d) after cascaded phase modulators driven by 25 and 12.5 GHz individually with a non-synchronized clock (50 degree shift).

FIGS. 3(a)-(d) illustrate simulation results. FIG. 3(a) shows the optical spectrum when only one phase modulator driven by 25 GHz clock source with 3.5 Vpi (half-wave voltage) is employed.

Figure 3B:
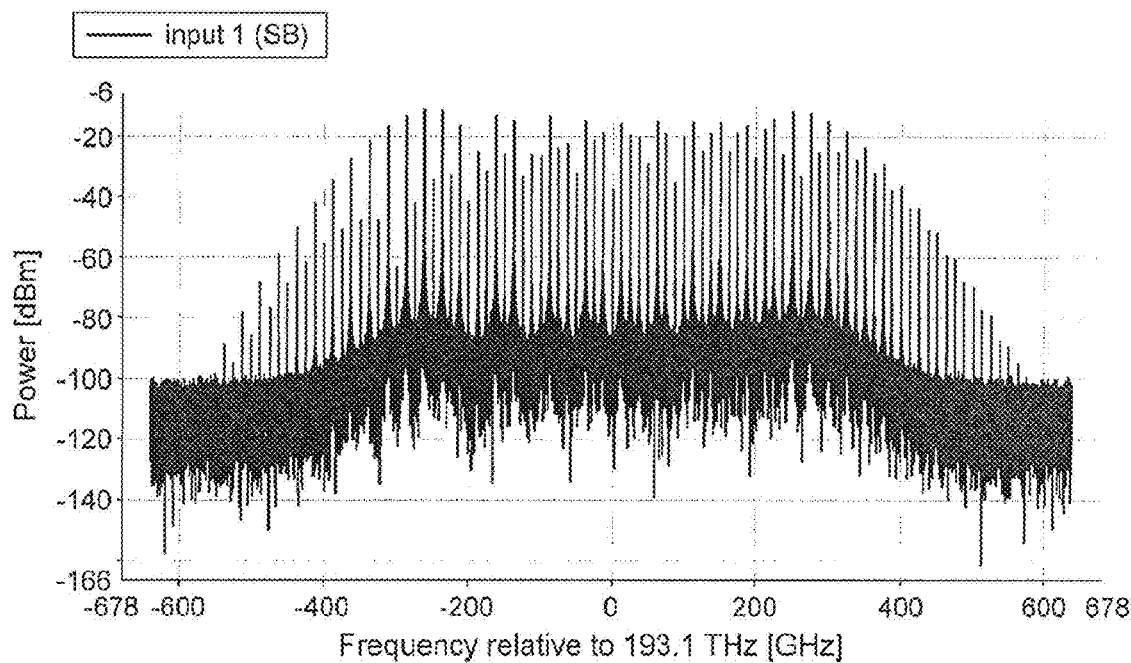

FIG. 3(b) shows the optical spectrum when an addition phase modulator driven by 12.5 GHz clock source with 1 Vpi with synchronized clock is employed.

FIG. 3(c) shows the optical spectrum when an addition phase modulator driven by 12.5 GHz clock source with V pi with non-synchronized clock (25 degree shift) is employed.

FIG. 3(d) shows the optical spectrum when an addition phase modulator driven by 12.5 GHz clock source with V pi with synchronized clock (50 degree shift) is employed. The subcarriers in FIG. 3(d) have flat amplitude relative to FIG. 3(a)-(c).

In certain aspects of the present invention, one or more of the elements provided may take the form of computing devices. A "computing device," as used herein, refers to a general purpose computing device that includes a processor. A processor generally includes a Central Processing Unit (CPU), such as a microprocessor. A CPU generally includes an arithmetic logic unit (ALU), which performs arithmetic and logical operations, and a control unit, which extracts instructions (e.g., code) from a computer readable medium, such as a memory, and decodes and executes them, calling on the ALU when necessary.

"Memory," as used herein, generally refers to one or more devices or media capable of storing data, such as in the form of chips or drives. Memory may take the form of one or more random-access memory (RAM), read-only memory (ROM), programmable read-only memory (PROM), erasable programmable read-only memory (EPROM), or electrically erasable programmable read-only memory "EEPROM) chips, by way of further non-limiting example only. Memory may take the form of one or more solid-state, optical or magnetic-based drives, by way of further non-limiting example only. Memory may be internal or external to an integrated unit including the processor. Memory may be internal or external to a computing device. Memory may store a computer program, e.g., code or a sequence of instructions being operable by the processor. In certain aspects of the present invention, one or more of the elements provided may take the form of code being executed using one or more computing devices, such as in the form of computer device executable programs or applications being stored in memory.

While embodiments of this invention have been shown and described, it will be apparent to those skilled in the art that many more modifications are possible without departing from the inventive concepts herein. As one example, the signal processing described herein may be implemented in software or in hardware. The invention, therefore, is not to be restricted except in the spirit of the following claims.

What is claimed:

1. A method of generating optical subcarrier signals comprising:
    modulating a lightwave by a first phase modulator having a half-wave voltage and being driven by a first radio frequency clock signal having (i) a first fixed frequency and (ii) a first amplitude at least 3.5 times greater than the half-wave voltage; modulating the lightwave by a cascaded second phase modulator being driven by a second radio frequency clock signal having (i) a second fixed frequency equal to half the first fixed frequency, and (ii) a second amplitude at least equal to the half-wave voltage.

2. The method of claim 1, wherein the first fixed frequency is not synchronized with the second fixed frequency.

3. The method of claim 1, further comprising modulating the lightwave by a cascaded third phase modulator.

4. The method of claim 3, wherein the third phase modulator is cascaded before or after one or both of the first phase modulator and the second phase modulator.

5. The method of claim 3, wherein the cascaded third phase modulator is driven by a third radio frequency signal having a fixed frequency equal to the first fixed frequency.

6. The method of claim 1, wherein the first phase modulator and the second phase modulator are synchronously driven.

7. The method of claim 1, further comprising modulating the lightwave by a cascaded third phase modulator, wherein the third cascaded phase modulator is synchronously driven with the first phase modulator but the cascaded second phase modulator is not synchronously driven with the first phase modulator.

8. The method of claim 1, wherein the first fixed frequency is 25 GHz, the first amplitude is 17 V, the half-wave voltage is 4 V, the second fixed frequency is 12.5 GHz, and the second amplitude is 4V.

9. A system for generating optical subcarrier signals comprising:
a first phase modulator having a half-wave voltage and being driven by a first radio frequency clock signal having (i) a first fixed frequency and (ii) a first amplitude at least 3.5 times greater than the half-wave voltage;
a cascaded second phase modulator driven by a second radio frequency clock signal having (i) a second fixed frequency equal to half the first fixed frequency, and (ii) a second amplitude at least equal to the half-wave voltage.

10. The system of claim 9, wherein the first fixed frequency is not synchronized with the second fixed frequency.

11. The system of claim 9, further comprising a cascaded third phase modulator.

12. The system of claim 11, wherein the third phase modulator is cascaded before or after one or both of the first phase modulator and the second phase modulator.

13. The system of claim 11, wherein the cascaded third phase modulator is configured to be driven by a third radio frequency signal having a fixed frequency equal to the first fixed frequency.

14. The system of claim 9, wherein the first phase modulator and the cascaded second phase modulator are synchronously driven.

15. The system of claim 9, further comprising a third cascaded phase modulator, wherein the third cascaded phase modulator is synchronously driven with the first phase modulator but the cascaded second phase modulator is not synchronously driven with the first phase modulator.

16. The system of claim 9, wherein the first fixed frequency is 25 GHz, the first amplitude is 17 V, the half-wave voltage is 4 V, the second fixed frequency is 12.5 GHz, and the second amplitude is 4V.

17. A computer program product for generating optical subcarrier signals, the computer program product residing on a non-transitory computer-readable medium and comprising computer-readable instructions configured to cause a computer to: modulate a lightwave by a first phase modulator having a half-wave voltage and being driven by a first radio frequency clock signal having (i) a first fixed frequency and (ii) a first amplitude at least 3.5 times greater than the half-wave voltage; modulating the lightwave by a cascaded second phase modulator being driven by a second radio frequency clock signal having (i) a second fixed frequency equal to half the first fixed frequency, and (ii) a second amplitude at least equal to the half-wave voltage.

18. The computer program product of claim 17, wherein the first fixed frequency is not synchronized with the second fixed frequency.

19. The computer program product of claim 17, wherein the computer-readable instructions are further configured to cause the computer to modulate the lightwave by a cascaded third phase modulator.

20. The computer program product of claim 19, wherein the third phase modulator is cascaded before or after one or both of the first phase modulator and the second phase modulator.

21. The computer program product of claim 19, wherein the cascaded third phase modulator is driven by a third radio frequency signal having a fixed frequency equal to the first fixed frequency.

22. The computer program product of claim 17, wherein the first phase modulator and the cascaded second phase modulator are synchronously driven.

23. The computer program product of claim 17, wherein the computer-readable instructions are further configured to cause the computer to modulate the lightwave by a cascaded third phase modulator, wherein the third cascaded phase modulator is synchronously driven with the first phase modulator but the cascaded second phase modulator is not synchronously driven with the first phase modulator.

24. The computer program product of claim 17, wherein the first fixed frequency is 25 GHz, the first amplitude is 17 V, the half-wave voltage is 4 V, the second fixed frequency is 12.5 GHz, and the second amplitude is 4V.

* * * * *